(12) United States Patent
Sylvain (10) Patent No.: US 9,723,520 B1
(45) Date of Patent: Aug. 1, 2017

(54) LOCATION BASED MODE SWITCHING FOR DUAL MODE MOBILE TERMINALS

(75) Inventor: Dany Sylvain, Gatineau (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 1311 days.

(21) Appl. No.: 11/313,048

(22) Filed: Dec. 20, 2005

(51) Int. Cl.
*H04W 36/00* (2009.01)
*H04W 36/08* (2009.01)
*H04W 36/14* (2009.01)
*H04W 36/24* (2009.01)
*H04W 4/02* (2009.01)
*H04W 48/18* (2009.01)
*H04W 84/12* (2009.01)

(52) U.S. Cl.
CPC ........... *H04W 36/00* (2013.01); *H04W 4/025* (2013.01); *H04W 36/14* (2013.01); *H04W 36/24* (2013.01); *H04W 48/18* (2013.01); *H04W 84/12* (2013.01); *H04W 36/08* (2013.01)

(58) Field of Classification Search
CPC . H04W 36/14; H04W 84/12; H04W 36/0022; H04W 4/02; H04W 36/0083; H04W 36/24; H04W 48/18; H04W 36/32; H04W 36/00; H04W 64/00; H04W 36/18; H04W 4/025; H04W 36/04; H04W 36/08; H04W 36/34; H04W 4/021; H04W 48/20; H04W 60/04
USPC .......... 455/426.1, 432.1, 440–444, 436, 437, 455/439, 456.1
See application file for complete search history.

(56) References Cited

U.S. PATENT DOCUMENTS

| | | | |
|---|---|---|---|
| 5,539,924 A * | 7/1996 | Grube et al. .................. | 455/509 |
| 6,295,455 B1 | 9/2001 | Fischer et al. | |
| 6,389,285 B1 * | 5/2002 | Escamilla et al. ............ | 455/438 |
| 6,433,735 B1 | 8/2002 | Bloebaum et al. | |
| 6,625,457 B1 | 9/2003 | Raith | |
| 6,748,439 B1 | 6/2004 | Monachello et al. | |
| 6,763,226 B1 | 7/2004 | McZeal, Jr. | |
| 6,829,481 B2 | 12/2004 | Souissi | |
| 6,862,277 B2 | 3/2005 | Pan et al. | |
| 6,925,378 B2 | 8/2005 | Tzamaloukas | |

(Continued)

FOREIGN PATENT DOCUMENTS

| | | |
|---|---|---|
| CA | 2533875 | 2/2005 |
| CA | 2533875 | 2/2014 |

(Continued)

OTHER PUBLICATIONS

"Final Office Action", U.S. Appl. No. 10/628,167, May 9, 2008, 11 pages.

(Continued)

*Primary Examiner* — Sujatha Sharma
(74) *Attorney, Agent, or Firm* — Vierra Magen Marcus LLP (57) ABSTRACT

The present invention provides a dual mode mobile terminal that is capable of supporting both cellular and local wireless communications. The mobile terminal operates to determine when to switch between local wireless communication and cellular modes. To determine when to switch between local wireless and cellular modes, the mobile terminal determines its current location, uses the current location to obtain mode switching information, and switches modes as necessary based on the mode switching information.

24 Claims, 9 Drawing Sheets

(56) References Cited

U.S. PATENT DOCUMENTS

| | | | |
|---|---|---|---|
| 7,016,326 B2 | 3/2006 | Holeman et al. | |
| 7,072,323 B2 | 7/2006 | Roberts et al. | |
| 7,072,657 B2 | 7/2006 | Watanabe et al. | |
| 7,197,569 B2 | 3/2007 | Dowling | |
| 7,248,858 B2 | 7/2007 | Barber et al. | |
| 7,251,488 B2 | 7/2007 | Chitrapu | |
| 7,251,490 B2 | 7/2007 | Rimoni | |
| 7,346,032 B2 | 3/2008 | Holeman et al. | |
| 7,382,756 B2 | 6/2008 | Barber et al. | |
| 7,385,947 B2 | 6/2008 | Wu et al. | |
| 7,466,986 B2 | 12/2008 | Halcrow et al. | |
| 7,499,705 B2 | 3/2009 | Rimomi et al. | |
| 7,583,632 B2 | 9/2009 | Janevski et al. | |
| 7,600,009 B2 | 10/2009 | Soininen et al. | |
| 7,623,486 B2 | 11/2009 | Caldwell et al. | |
| 7,646,710 B2 | 1/2010 | Christie, IV | |
| 7,646,745 B2 | 1/2010 | Caldwell et al. | |
| 7,706,796 B2 | 4/2010 | Rimoni et al. | |
| 7,873,352 B2 | 1/2011 | Nguyen et al. | |
| 7,912,978 B2 | 3/2011 | Swildens et al. | |
| 7,937,043 B2 | 5/2011 | Wandel | |
| 7,961,687 B2 | 6/2011 | Holeman et al. | |
| 8,107,457 B2 | 1/2012 | White et al. | |
| 8,107,954 B2 | 1/2012 | Islam et al. | |
| 8,145,135 B2 * | 3/2012 | Dalsgaard et al. | 455/67.11 |
| 8,270,948 B2 | 9/2012 | Oba et al. | |
| 8,489,108 B2 | 7/2013 | Chan et al. | |
| 8,638,760 B2 | 1/2014 | Jarzra et al. | |
| 8,644,142 B2 | 2/2014 | Christie, IV | |
| 8,666,399 B2 | 3/2014 | Kholaif et al. | |
| 2002/0026527 A1 | 2/2002 | Das et al. | |
| 2002/0087724 A1 | 7/2002 | Datta et al. | |
| 2002/0143971 A1 | 10/2002 | Govindarajan et al. | |
| 2002/0147008 A1 * | 10/2002 | Kallio | 455/426 |
| 2003/0108006 A1 | 6/2003 | Holeman et al. | |
| 2003/0108007 A1 | 6/2003 | Holeman et al. | |
| 2003/0118015 A1 | 6/2003 | Gunnarsson et al. | |
| 2003/0133425 A1 | 7/2003 | Radhakrishnan et al. | |
| 2003/0172145 A1 | 9/2003 | Nguyen | |
| 2003/0214958 A1 | 11/2003 | Madour et al. | |
| 2003/0219022 A1 | 11/2003 | Dillon et al. | |
| 2003/0227883 A1 | 12/2003 | Rimoni et al. | |
| 2004/0018829 A1 | 1/2004 | Raman et al. | |
| 2004/0023669 A1 * | 2/2004 | Reddy | 455/456.1 |
| 2004/0073642 A1 | 4/2004 | Iyer | |
| 2004/0081159 A1 | 4/2004 | Pan et al. | |
| 2004/0203848 A1 | 10/2004 | Kumar | |
| 2004/0205233 A1 | 10/2004 | Dunk | |
| 2004/0218605 A1 | 11/2004 | Gustafsson et al. | |
| 2005/0003835 A1 | 1/2005 | Riise et al. | |
| 2005/0037758 A1 | 2/2005 | Rimoni | |
| 2005/0048977 A1 * | 3/2005 | Dorenbosch et al. | 455/441 |
| 2005/0197156 A1 * | 9/2005 | Fourquin | H04W 36/0072 455/553.1 |
| 2005/0239461 A1 * | 10/2005 | Verma et al. | 455/435.1 |
| 2005/0245269 A1 | 11/2005 | Demirhan et al. | |
| 2005/0255856 A1 | 11/2005 | Griffin et al. | |
| 2006/0019653 A1 * | 1/2006 | Stamoulis et al. | 455/425 |
| 2006/0045056 A1 * | 3/2006 | O'Hara, Jr. | 370/338 |
| 2006/0092890 A1 | 5/2006 | Gupta et al. | |
| 2006/0126558 A1 * | 6/2006 | Lee | H04W 36/14 370/329 |
| 2006/0135165 A1 | 6/2006 | Faccin | |
| 2006/0221901 A1 | 10/2006 | Yaqub et al. | |
| 2006/0232663 A1 * | 10/2006 | Gandhi et al. | 348/14.02 |
| 2006/0245408 A1 * | 11/2006 | Lee et al. | 370/338 |
| 2007/0008926 A1 | 1/2007 | Oba | |
| 2007/0049274 A1 | 3/2007 | Yacobi et al. | |
| 2007/0049276 A1 | 3/2007 | Rimoni et al. | |
| 2007/0076662 A1 | 4/2007 | Jain et al. | |
| 2007/0086378 A1 | 4/2007 | Matta et al. | |
| 2007/0117572 A1 | 5/2007 | Adam et al. | |
| 2007/0178933 A1 | 8/2007 | Nelson | |
| 2007/0184835 A1 | 8/2007 | Bitran et al. | |
| 2008/0031194 A1 | 2/2008 | Yaqub | |
| 2008/0049702 A1 | 2/2008 | Meylan et al. | |
| 2008/0161001 A1 | 7/2008 | Holeman et al. | |
| 2008/0170525 A1 | 7/2008 | Geiger | |
| 2008/0274715 A1 | 11/2008 | Heit et al. | |
| 2009/0005041 A1 | 1/2009 | Steinberg et al. | |
| 2009/0063174 A1 | 3/2009 | Fricke | |
| 2009/0124284 A1 | 5/2009 | Scherzer et al. | |
| 2009/0131084 A1 | 5/2009 | Comstock et al. | |
| 2010/0034133 A1 | 2/2010 | Marom et al. | |
| 2010/0103829 A1 | 4/2010 | Murzeau et al. | |
| 2010/0144371 A1 | 6/2010 | Savoor | |
| 2010/0172274 A1 | 7/2010 | Wu et al. | |
| 2010/0254346 A1 | 10/2010 | Jain et al. | |
| 2010/0291947 A1 | 11/2010 | Annamalai | |
| 2011/0013569 A1 | 1/2011 | Scherzer et al. | |
| 2011/0064058 A1 | 3/2011 | Rimoni et al. | |
| 2011/0116479 A1 | 5/2011 | Jarzra et al. | |
| 2011/0124334 A1 | 5/2011 | Brisebois et al. | |
| 2011/0275378 A1 | 11/2011 | Kwon et al. | |
| 2011/0300865 A1 | 12/2011 | Kashikar et al. | |
| 2011/0310866 A1 | 12/2011 | Kennedy et al. | |
| 2012/0020296 A1 | 1/2012 | Scherzer et al. | |
| 2012/0096520 A1 | 4/2012 | Dutta et al. | |
| 2012/0170560 A1 | 7/2012 | Han et al. | |
| 2012/0311016 A1 | 12/2012 | Deanna et al. | |
| 2013/0217414 A1 | 8/2013 | Nagaraj | |
| 2013/0310055 A1 | 11/2013 | Dewing et al. | |
| 2014/0003261 A1 | 1/2014 | Gillett et al. | |
| 2014/0003404 A1 | 1/2014 | Gillett et al. | |
| 2014/0003405 A1 | 1/2014 | Gillett et al. | |
| 2014/0004886 A1 | 1/2014 | Gillett et al. | |
| 2014/0040486 A1 | 2/2014 | Christie | |
| 2014/0242997 A1 | 8/2014 | Golan et al. | |

FOREIGN PATENT DOCUMENTS

| | | | |
|---|---|---|---|
| EP | 0967815 | | 12/1999 |
| EP | 1124396 | | 8/2001 |
| EP | 1924114 | | 5/2008 |
| EP | 2051458 | | 4/2009 |
| EP | 2112858 | | 10/2009 |
| EP | 2282587 | | 2/2011 |
| EP | 2418883 | | 2/2012 |
| EP | 2475219 | | 7/2012 |
| GB | 2481254 | | 12/2011 |
| SE | EP0961512 | * | 1/1999 |
| WO | WO-9817030 | | 4/1998 |
| WO | WO-0010306 | | 2/2000 |
| WO | WO-0028751 | | 5/2000 |
| WO | WO-2005011173 | | 2/2005 |
| WO | WO-2007000391 | | 1/2007 |
| WO | WO-2007103975 | | 9/2007 |

OTHER PUBLICATIONS

"Final Office Action", U.S. Appl. No. 12/685,486, Nov. 5, 2012, 24 pages.

"Foreign Notice of Allowance", CA Application No. 2,533,875, Oct. 11, 2013, 2 Pages.

"Foreign Office Action", CA Application No. 2,533,875, Feb. 27, 2012, 3 pages.

"Foreign Office Action", CA Application No. 2,533,875, May 13, 2013, 3 pages.

"Foreign Office Action", Canada Application No. 2,533,875, May 13, 2013, 3 Pages.

"HF Transceiver CODAN NGT SRx", Retrieved From <http://hf-ssb-transceiver.at-communication.com/en/codan/hf_ssb_transceiver_ngtsrx.html> on Apr. 25, 2012, Apr. 1, 2010, 9 pages.

"International Search Report and Written Opinion", Application No. PCT/US2013/047736, Oct. 11, 2013, 10 pages.

"International Search Report and Written Opinion", Application No. PCT/US2013/047734, Sep. 30, 2013, 12 pages.

"International Search Report and Written Opinion", Application No. PCT/US2013/047448, Sep. 23, 2013, 15 pages.

"International Search Report and Written Opinion", Application No. PCT/US2013/048009, Dec. 11, 2013, 9 pages.

(56) References Cited

OTHER PUBLICATIONS

"International Search Report", Application No. PCT/IB2004/002415, Jan. 25, 2005, 2 pages.
"Non-Final Office Action", U.S. Appl. No. 10/628,167, Jul. 6, 2007, 9 pages.
"Non-Final Office Action", U.S. Appl. No. 10/628,167, Nov. 17, 2008, 11 pages.
"Non-Final Office Action", U.S. Appl. No. 10/628,167, Dec. 26, 2007, 8 pages.
"Non-Final Office Action", U.S. Appl. No. 13/666,719, Jun. 4, 2014, 60 pages.
"Non-Final Office Action", U.S. Appl. No. 13/666,739, Jun. 16, 2014, 28 pages.
"Non-Final Office Action", U.S. Appl. No. 13/668,116, Apr. 21, 2014, 12 pages.
"Non-Final Office Action", U.S. Appl. No. 13/671,387, Jul. 9, 2014, 25 pages.
"Notice of Allowance", U.S. Appl. No. 10/628,167, Aug. 28, 2009, 4 pages.
"Notice of Allowance", U.S. Appl. No. 12/685,486, Jun. 7, 2013, 10 pages.
"Notice of Allowance", U.S. Appl. No. 12/685,486, Sep. 25, 2013, 9 pages.
"Supplementary European Search Report", EP Application No. 04769100.1, Oct. 7, 2011, 3 pages.
"Written Opinion", Application No. PCT/IB2004/002415, Feb. 2, 2005, 6 pages.
Akyildiz, et al., "A Survey of Mobility Management in Next-Generation all-IP-based Wireless Systems", In IEEE Wireless Communications, vol. 11, Issue 4, Aug. 2004, pp. 16-28.
Chen, et al., "Active Application Oriented Vertical Handoff in Next-Generation Wireless Networks", IEEE Communications Society, WCNC 2005, 2005, pp. 1383-1388.
Chew, "The Integration of Positioning Technologies for Precise Location Identification", Jan. 11, 2005, 138 pages.
Kim, et al., "Improving Energy Efficiency of Wi-Fi Sensing on Smartphones", IEEE Infocom 2001, 2001, pp. 2930-2938.
McGuire, et al., "Estimating Position of Mobile Terminals with Survey Data", In EURASIP Journal on Applied Signal Processing, vol. 1, Oct. 1, 2001, pp. 58-66.

Nicholson, et al., "BreadCrumbs: Forecasting Mobile Connectivity", Proceedings of the 14th ACM international conference on Mobile computing and networking, 2008, 2008, pp. 41-57.
Sun, et al., "Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.
Zimmerman, et al., "Database Correlation for Positioning of Mobile Terminals in Cellular Networks using Wave Propagation Models", In IEEE 60th Vehicular Technology Conference, vol. 7, Sep. 26, 2004, pp. 4682-4686.
"Final Office Action", U.S. Appl. No. 13/668,116, Sep. 25, 2014, 10 pages.
"Foreign Office Action", CA Application No. 2,836,894, Sep. 22, 2014, 2 Pages.
"International Search Report and Written Opinion", Application No. PCT/US2014/018130, Jun. 2, 2014, 11 pages.
"Non-Final Office Action", U.S. Appl. No. 12/685,486, Jun. 7, 2012, 5 pages.
Zhao, et al., "Handshake Time and Transmission Rate of 802.11g Measurement in Vehicular Networks", IEEE 35th Conference on Local Computer Networks (LCN), Oct. 10, 2010, pp. 730-736.
"Non-Final Office Action", U.S. Appl. No. 14/045,524, Dec. 10, 2014, 13 pages.
"Final Office Action", U.S. Appl. No. 13/671,387, Dec. 19, 2014, 4 pages.
"Final Office Action", U.S. Appl. No. 13/666,739, May 20, 2015, 26 pages.
"Final Office Action", U.S. Appl. No. 14/045,524, Mar. 19, 2015, 16 pages.
"Notice of Allowance", U.S. Appl. No. 13/668,116, Mar. 20, 2015, 4 pages.
"Notice of Allowance", U.S. Appl. No. 13/671,387, Mar. 30, 2015, 15 pages.
"Notice of Allowance", U.S. Appl. No. 14/045,524, Jul. 10, 2015, 7 pages.
"Supplemental Notice of Allowance", U.S. Appl. No. 13/668,116, Apr. 23, 2015, 2 pages.

* cited by examiner

FIG. 2A

LOCAL WIRELESS MODE

| ZONE | HO TO CELLULAR ALLOWED | CELLULAR I/F STATE | HO TO CELLULAR POWER REQUIREMENTS | | UPDATE POWER MEASUREMENTS | CONSECUTIVE CONSISTENT POWER MEASUREMENTS BEFORE CHANGE | UPDATE LOCATION AND MODE HO INFORMATION |
|---|---|---|---|---|---|---|---|
| | | | LW (dBm) | CELLULAR (dBm) | | | |
| 3 | NO | OFF | N/A | N/A | N/A | N/A | EVERY 15 SECONDS |
| 2 | YES | STANDBY | <65 | >50 | EVERY 5 SECONDS | 5 | EVERY 15 SECONDS |
| 1 | YES | STANDBY | <55 | >60 | EVERY 2 SECONDS | 2 | EVERY 5 SECONDS |
| UNKNOWN | YES | STANDBY | <55 | >60 | EVERY SECOND | 2 | EVERY 5 SECONDS |

FIG. 2B

CELLULAR MODE

| HO TO LOCAL WIRELESS ALLOWED | LOCAL WIRELESS I/F STATE | HO TO LOCAL WIRELESS REQUIREMENTS (LW dBm) | UPDATE LW POWER MEASUREMENTS | CONSECUTIVE CONSISTENT POWER MEASUREMENTS BEFORE CHANGE | UPDATE LOCATION AND MODE HO INFORMATION |
|---|---|---|---|---|---|
| YES | OFF | >45 dBm | EVERY 30 SECONDS | 2 | EVERY 120 SECONDS |

LOCATION BASED MODE SWITCHING FOR DUAL MODE MOBILE TERMINALS

FIELD OF THE INVENTION

The present invention relates to telecommunications and in particular to controlling transitions between and local wireless and cellular communication modes in a dual mode mobile terminal.

BACKGROUND OF THE INVENTION

Wireless communications for the masses have historically been supported by cellular networks. In cellular networks, base stations are geographically distributed over a given coverage area and form cells in which cellular communications are supported. As a mobile terminal moves from cell to cell, communication support is transferred from one base station to another. If the mobile terminal is engaged in a call, adjacent base stations and the mobile terminal cooperate to perform a handoff from one base station to another in a manner imperceptible to the user. Cellular communications have generally been used to support calls using circuit-switched connections in association with a public switched telephone network.

With the evolution of packet networks and corresponding wireless access mechanisms, the availability and popularity of supporting voice-based calls over a packet network have dramatically increased. Such packet-based calls are often referred to as voice over packet (VoP) calls or voice over Internet Protocol (VoIP) calls, when the calls are supported by the Internet Protocol (IP). VoP calls can now be established between various communication terminals that support packet communications, as well as with traditional PSTN communication terminals via gateways, which support communications between the PSTN and packet networks. As a communication terminal moves from one local wireless communication zone to another, handoffs from one access point to another are made.

The access mechanisms for packet networks often provide local wireless access based on various wireless local area network standards, such as those promulgated by the IEEE's 802.11 standard and the Bluetooth standard. Wireless access points, which provide access to the packet network, can be geographically distributed to support contiguous communications zones for a given area. Local wireless communication zones are generally much smaller than cellular network cells and were initially used to provide Internet access for residential and business use. Now local, wireless communications are being used to replace wired local area networks (LANs) as well as support VoP calls in areas where cellular coverage is unavailable or unacceptable as well as in areas where an alternative to cellular access is desired.

Since calls can be supported by packet networks and cellular networks, there is a movement to develop dual mode mobile terminals capable of supporting cellular calls over the cellular network via cellular access as well as VoP calls over the packet network via local wireless access. When access for a call is supported entirely through either cellular or local wireless access, handoffs from base station to base station or from access point to access point are controlled using the handoff techniques for cellular or local wireless communications, respectively. When the dual mode mobile terminal needs to change from operating in a local wireless mode to the cellular mode or vice versa, mode switching must be performed. If a call is in progress when mode switching is necessary, continuity of the call must be maintained by facilitating a handoff from local wireless support to cellular support or vice versa.

Although numerous techniques are available for effecting mode switching between local wireless and cellular modes, the existing techniques for determining when to initiate mode switching are lacking. Existing techniques rely primarily, if not solely, on generic signal strength thresholds for signals received from the base station or access point. Primary reliance on the generic signal strength threshold are often unreliable due to the manner in which channel conditions can fluctuate throughout a local wireless zone or from one local wireless zone to another, especially communication zones near or inside buildings. Setting power thresholds for mode switching too high increases the risk of dropping a call, and setting power thresholds too low unnecessarily increases the number of mode switches. Accordingly, there is a need for a more efficient mode switching technique that minimizes unnecessary mode handoffs while ensuring communication support is not lost.

SUMMARY OF THE INVENTION

The present invention provides a dual mode mobile terminal that is capable of supporting both cellular and local wireless communications. The mobile terminal operates to determine when to switch between local wireless communication and cellular modes. To determine when to switch between local wireless and cellular modes, the mobile terminal determines its current location, uses the current location to obtain mode switching information, and switches modes as necessary based on the mode switching information.

The mode switching information defines switching criteria for the mobile terminal to use for controlling mode switching. The mode switching information may differ based on the current operating mode, either cellular or local wireless, as well as from one location to another. As such, the switching criteria can be location-specific and will generally correspond to defined areas. The defined areas may correspond to local wireless zones. Providing customized switching criteria based on characteristics of the different areas allows the mobile terminal to determine if mode switching is necessary and when mode switching should take place in a more efficient and effective manner.

The switching criteria may define various parameters. For example, the switching criteria may control whether mode switching is allowed for a given area as well as indicate the state in which to keep local wireless or cellular interfaces. The switching criteria may define how often the location and mode switching information is updated and switching thresholds for signal levels associated with local wireless and cellular signals. When in a local wireless mode, the mobile terminal may systematically update the location information and retrieve mode switching information defining switching criteria for switching to cellular mode. While in the local wireless mode, the mobile terminal may also determine mode switching information defining switching criteria for switching from cellular mode to the local wireless mode. Thus, when the mobile terminal ultimately switches to cellular mode, the switching criteria for switching back to local wireless mode are available.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a dual mode mobile terminal that is capable of supporting both cellular and local wireless communications. The mobile terminal operates to determine when to switch between local wireless and cellular modes. To determine when to switch between the local wireless and cellular modes, the mobile terminal determines its current location, uses the current location to obtain mode switching information, and switches modes as necessary based on the mode switching information. The mode switching information defines switching criteria specific to an area, such as a local wireless zone, corresponding to the current location of the mobile terminal. Prior to delving into the details of the present invention, an overview of a communication environment in which mode handoffs are beneficial is provided.

Figure 1:
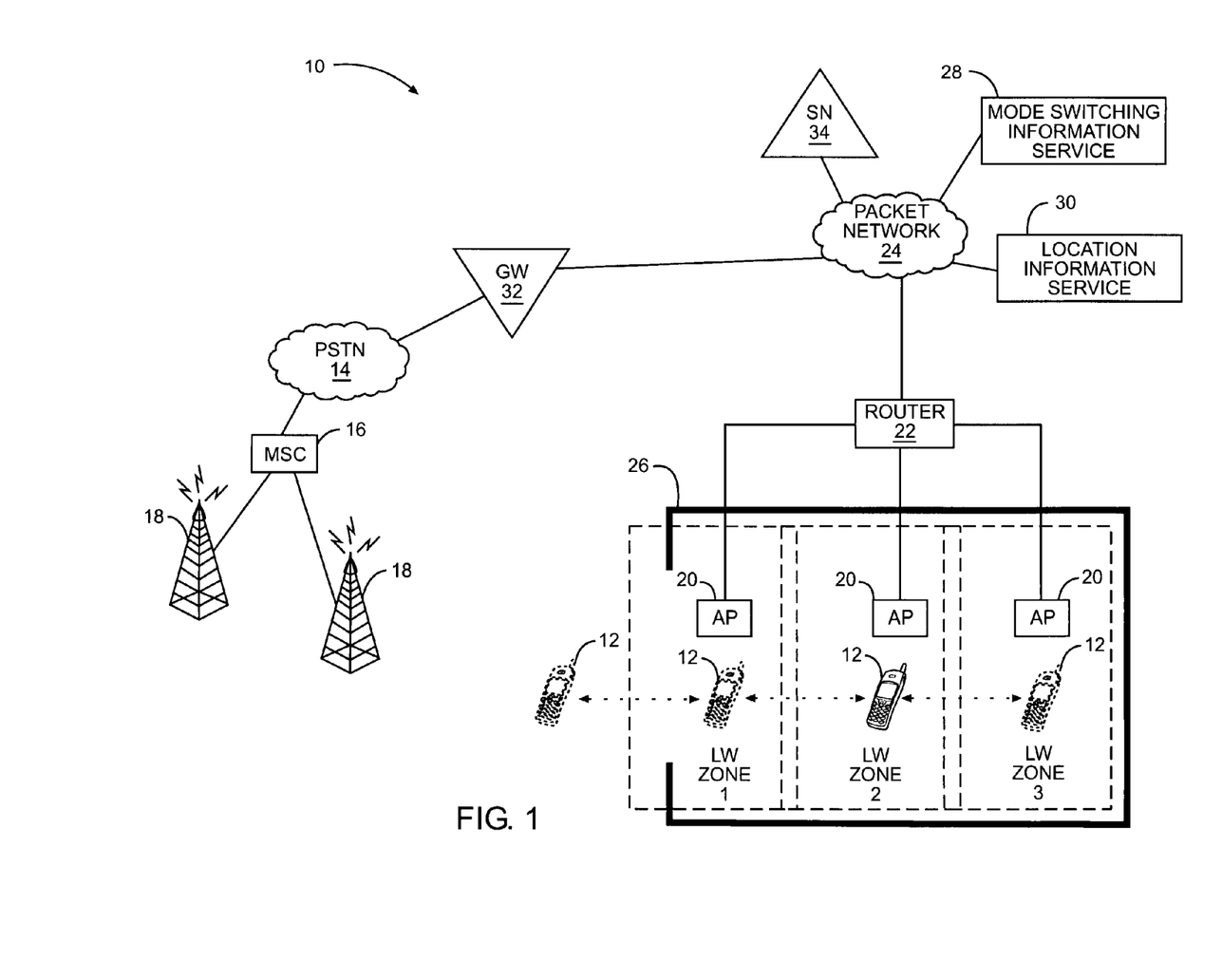
FIG. 1 is a block representation of a communication network according to one embodiment of the present invention.

With reference to FIG. 1, a communication environment 10 is illustrated according to one embodiment of the present invention. A mobile terminal 12 is capable of supporting both cellular communications and local wireless communications facilitated by a number of relatively limited range wireless communication techniques, such as those set forth in the IEEE 802.11 and Bluetooth standards. The mobile terminal 12 will have a cellular interface capable of establishing cellular communications with a public switched telephone network (PSTN) 14 via a mobile switching center (MSC) 16 and any number of base stations 18, which form cellular coverage areas, referred to as cells, to establish a cellular network. For local wireless communications, the mobile terminal 12 will include a local wireless interface capable of affording local wireless communications with any number of access points (APs) 20 when the mobile terminal 12 is within communication range of the access point 20. The area in which the mobile terminal 12 is sufficiently proximate to an access point 20 to facilitate local wireless communications is referred to as a local wireless (LW) zone. Three local wireless zones are illustrated in FIG. 1, LW Zone 1, LW Zone 2, and LW Zone 3. Each access point 20 will connect to a router 22 or appropriate access network that is coupled to a packet network 24, which supports packet-based communications.

As illustrated, local wireless zones 1, 2, and 3 are adjacent to one another and cooperate to provide local wireless coverage throughout a building 26. In particular, local wireless zone 1 provides local wireless coverage covering an area in front of the building 26, the entrance to the building 26, and an area extending about a quarter of the way into the building 26. Local wireless zone 2 slightly overlaps local wireless zone 1, and covers another quarter of the interior space of the building 26. Local wireless zone 3 slightly overlaps local wireless zone 2, and covers the remaining interior portion of the building 26. Notably, the local wireless zones may take any shape, may vary in size, and may or may not be contiguous. The local wireless zones 1, 2, 3 do not necessarily have a one-for-one correspondence to the coverage area provided by each of the access points 12, although such deployment could be a simple way to define local wireless zones. In such a case, a central location server may not be used and the BSSID (Basic Service Set Identifier) of the access point 12 may be used to approximate the location of the mobile terminal 12. The local wireless zones 1, 2, and 3 are merely illustrated as shown to provide an example of how mode switching can be controlled according to one embodiment of the present invention. As illustrated, the mobile terminal 12 may move throughout the local wireless zones 1, 2, and 3 as well as outside of the local wireless zones 1, 2, and 3. For this example, assume at least minimal cell coverage is provided throughout some of the local wireless zones 1, 2, and 3.

In operation, the mobile terminal 12 obtains mode switching information, which provides the switching criteria for determining if and when to initiate mode switching, based on its current location. When in a cellular mode, the mode switching information may provide switching criteria controlling when to initiate mode switching from the cellular mode to a local wireless mode. When in a local wireless mode, the mode switching information may provide switching criteria defining when to initiate mode switching from the local wireless mode to a cellular mode. The mode switching information when operating in local wireless mode is generally based on a local wireless zone in which the mobile terminal 12 is currently located. If a particular local wireless zone cannot be identified, default mode switching information and corresponding switching criteria are used to control mode switching. As illustrated, the mode switching information can be retrieved from a mode switching information service 28, which resides on the packet network 24. The particular mode switching information for a specific local wireless zone is retrieved based on the current location of the mobile terminal 12. The current location of the mobile terminal 12 can be provided by a location information service 30.

The mode switching information service 28 and the location information service 30 may be provided by different entities or may be integrated as a common service. Further, aspects of the mode switching information service 28 and location information service 30 may be integrated in whole or in part on the mobile terminal 12, depending on the desires of the network service providers. There are numerous techniques for determining a relatively precise location of a mobile terminal 12, and the specifics of these techniques are outside the scope of the present invention. In general, these techniques range from using internal location determining functions based on Global Positioning System (GPS) signals, or supporting information that can be used to provide the mobile terminal 12 with sufficient location information to use for obtaining mode switching information corresponding to the current location of the mobile terminal 12. Additional information may be found in U.S. application Ser. No. 11/294,053 filed Dec. 5, 2005, entitled CREATING AND RECOGNIZING USER-DEFINED LOCATIONS USING COMMUNICATION TERMINALS, which is incorporated herein by reference in its entirety.

In the illustrated embodiment, assume the location information service 30 is capable of retrieving information from various network entities to determine the current location of the mobile terminal 12 at any given time, and provide the location information to the mobile terminal 12, which can use the location information to obtain the mode switching information from the mode switching information service 28 on a systematic basis. In the illustrated embodiment, the mobile terminal 12 is able to obtain the current location from the location information service 30 and the mode switching information from the mode switching information service 28 while operating in local wireless mode. However, those skilled in the art will recognize that the same information could be obtained through location services afforded by the MSC 16 and associated cellular infrastructure (not shown).

FIG. 1 also depicts a gateway 32 that facilitates interworking between the PSTN 14 and the packet network 24. The interworking allows calls to be established in part over the PSTN 14 and in part over the packet network 24. A service node 34 may act as a proxy for the mobile terminal 12 while in local wireless mode, and may facilitate initiation and establishment of packet-based communication sessions through the packet network 24 with other packet-based communication terminals, or the gateway 32 when a call is established with a circuit-switched communication terminal.

Figure 2A:
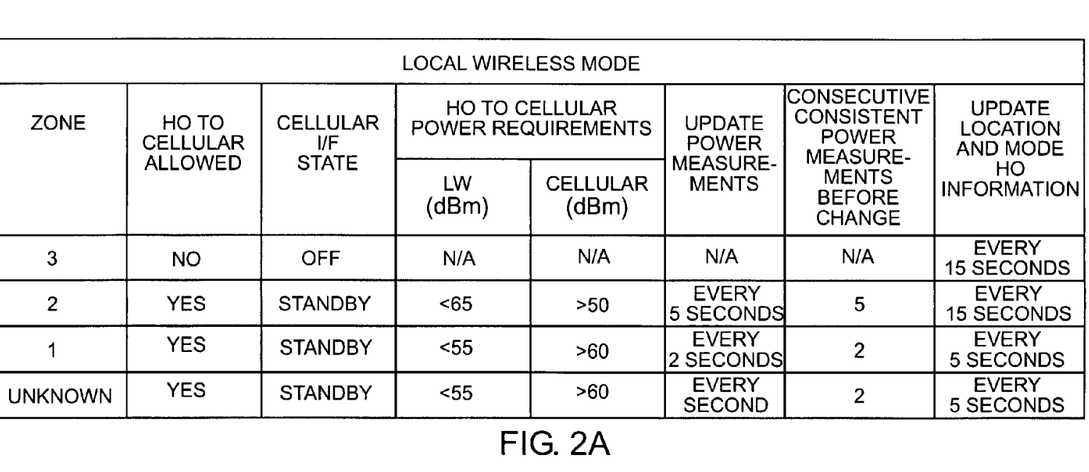
FIG. 2A is a table illustrating mode switching information when a mobile terminal is operating in a local wireless mode according to one embodiment of the present invention.

FIG. 2A provides a table representative of mode switching information for local wireless zones 1-3 as well as default mode switching information for local wireless zones that do not have specific mode switching information defined. In the illustrated example, the mode switching information for zones 1, 2, and 3, as well as the default (unknown) mode switching information contains various switching criteria. Again, the switching criteria illustrated is merely for example, and is not intended to represent a necessary or comprehensive list of parameters that may be used to provide switching criteria. The illustrated switching criteria include the following:

an indication as to whether mode switching from local wireless mode to cellular mode is allowed;
the state in which to keep the cellular interface;
power thresholds for signals received from the local wireless access points 20 or the cellular base stations 18;
a polling interval for updating power measurements;
the number of consecutive consistent power measurements needed before mode switching is initiated; and
the frequency at which to update location and zone information.

The switching criteria for the various local wireless zones 1, 2, and 3 are based on the likelihood that the mobile terminal 12 will need to switch to cellular mode from local wireless mode within a given period. With reference to FIG. 1, it is unlikely that the mobile terminal 12 will need to switch from local wireless mode to cellular mode in a short period of time when located in local wireless zone 3. However, when located in local wireless zone 1, the mobile terminal 12 could quickly leave local wireless zone 1 and not be within local wireless communication range of an access point 20, and thus require mode switching to cellular mode. Further, the local wireless zones 1, 2, and 3 provide complete coverage throughout the building 26, and since there are no regularly used exits other than the exit shown, the mobile terminal 12 will always have local wireless communication coverage when within the building 26, and will require cellular support within a given distance outside of the building 26. The mode switching information provided in table in FIG. 2A reflects these characteristics.

For example, zone 3 does not allow local wireless mode to cellular mode switching. As such, the cellular interface is deactivated, no power measurements are monitored for mode switching purposes, and a relatively long time is provided between updating the location and mode switching information. Since zone 2 is moving closer to the exit of the building 26 and closer to an area in which cellular support is required, mode switching from local wireless mode to cellular mode is allowed if certain power requirements associated with signals received from proximate base stations 18 and access points 20 are fulfilled. Further, the cellular interface may be activated to a standby mode. The power measurements are updated every five seconds, but the location and mode switching information is only updated every 15 seconds, as mode switching to cellular mode is allowed and the mobile terminal 12 is still relatively far from the exit of the building 26. Given the distance from the exit, there must be five consecutive consistent power measurements within the handoff criteria before triggering mode switching to cellular mode. To initiate mode switching to cellular mode, the power requirements from the local wireless access point 20 must be less than 65 dBm, and the power requirements from a base station 18 must be greater than 50 dBm. If the respective power requirements fall within these two ranges for five consecutive power measurements, which are taken every five seconds, mode switching from local wireless mode to cellular mode is facilitated. If the mobile terminal 12 is not engaged in a call, and mode switching is not required, the mobile terminal 12 can simply switch from local wireless mode to cellular mode, since an actual call handoff is not required.

From the table in FIG. 2A, one can see that power measurements are taken more frequently and only two consecutive consistent power measurements are required before triggering mode switching. Further, updating of the location and mode switching information occurs much more frequently. The local wireless power requirements are relaxed while the cellular power requirements are increased, in an effort to avoid unnecessary mode switching, but to ensure quick response when mode switching is required. The default switching criteria is similar to that of zone 1, with the exception that the power measurements are updated every second instead of every two seconds. Accordingly, the default mode switching information has the minimal requirements for initiating mode switching from local wireless mode to cellular mode. As noted, if a call is not being supported by the mobile terminal 12, the mobile terminal 12 will simply switch from operating in the cellular mode from the local wireless mode when the switching criteria is fulfilled.

Figure 2B:
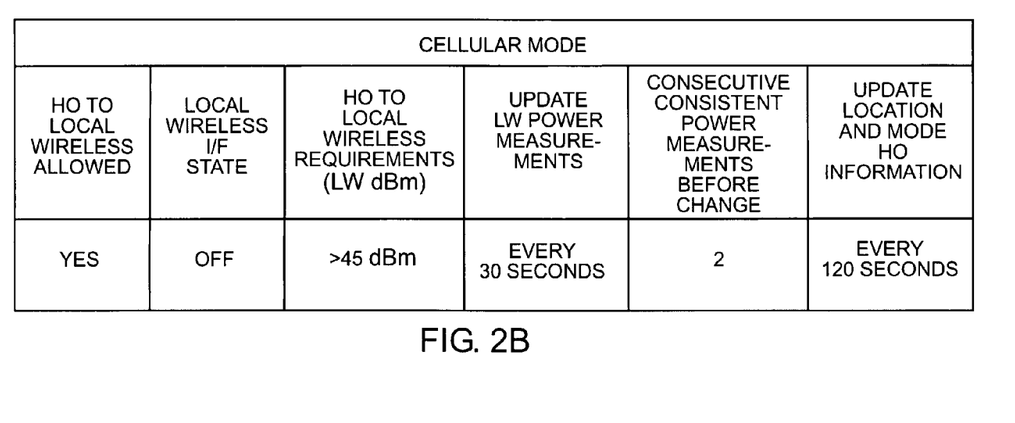
FIG. 2B is a table illustrating mode switching information when a mobile terminal is operating in a cellular mode according to one embodiment of the present invention.

When operating in local wireless mode, mode switching information pertaining to when the switch to local wireless mode when in cellular mode may be obtained from the mode switching information service 28. As illustrated in FIG. 2B, similar switching criteria may be defined to control the mode switching from cellular mode to local wireless mode. In the illustrated example, mode switching to local wireless mode is always allowed, but the local wireless interface state is deactivated, or off, to save power. When operating in cellular mode, there is generally a greater likelihood of continued cellular coverage and little likelihood of an abrupt break in cellular coverage. In essence, there is generally more time available to transition from cellular mode to local wireless mode. Accordingly, the local wireless power measurements are only updated every thirty seconds, and the minimum local wireless power threshold (>45 dBm) requires two consecutive consistent power measurements before initiating transition from the cellular mode to the local wireless mode. The location and mode switching information is updated every 120 seconds, significantly longer than the updates when operating in local wireless mode.

Figure 3A:
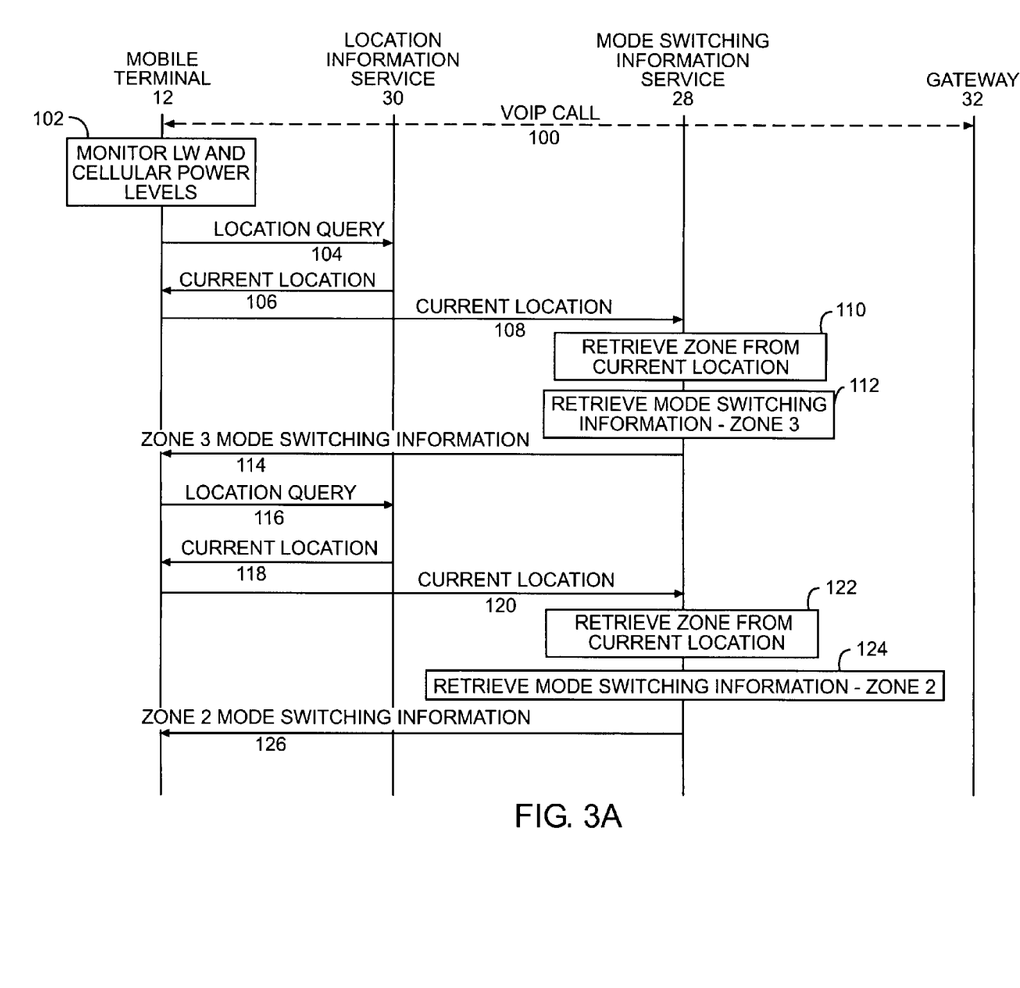
FIGS. 3A and 3B are a communication flow illustrating the operation of a mobile terminal according to one embodiment of the present invention.
Figure 3B:
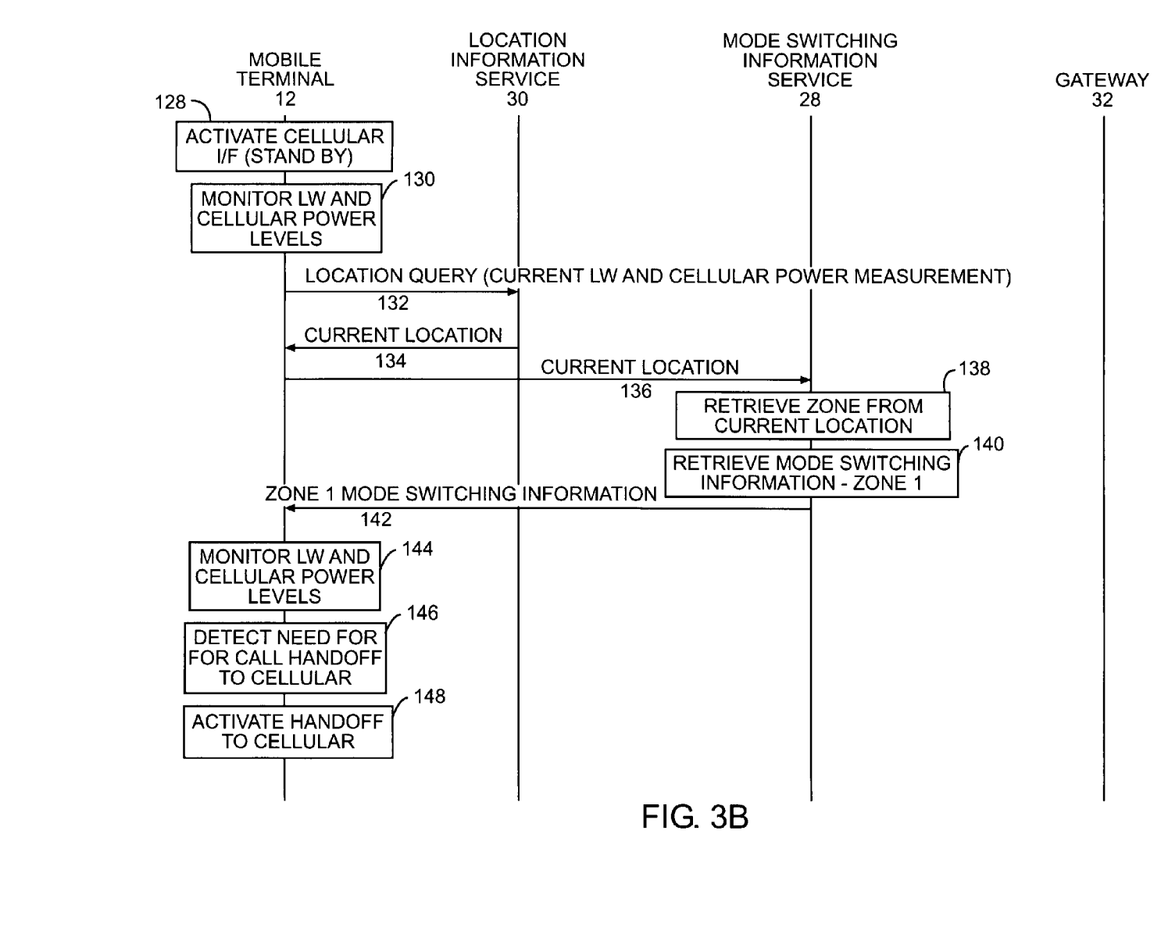

With reference to FIGS. 3A and 3B, a communication flow is illustrated wherein the mobile terminal 12 moves from local wireless zone 3 to the exit of building 26 in FIG. 1, and outside of the coverage area of local wireless zone 1 wherein mode switching is performed to switch the mobile terminal 12 to cellular mode. Initially, assume the mobile terminal 12 is operating in local wireless mode and currently supporting a VoIP call (step 100), wherein the packet portion of the call is terminated at the gateway 32, which will provide a circuit-switched connection to the other party to the call (not shown). While operating in local wireless mode, the mobile terminal 12 will monitor local wireless and cellular power levels (step 102) and send a Location Query to the location information service 30 (step 104). The Location Query will request the current location for the mobile terminal 12 from the location information service 30. The Location Query may include the local wireless and cellular power measurements, if the measurements are needed to aid in determining the current location of the mobile terminal 12.

The location information service 30 will determine the current location of the mobile terminal 12, and provide the current location to the mobile terminal 12 (step 106). The mobile terminal 12 will send the current location to the mode switching information service 28 (step 108), which will use the current location information to retrieve the zone in which the mobile terminal 12 is located (step 110). The mode switching information service 28 will then retrieve the mode switching information for the local wireless zone in which the mobile terminal 12 is located (step 112). In this instance, the local wireless zone in which the mobile terminal 12 is located is local wireless zone 3, and the mode switching information for zone 3 sent to the mobile terminal 12 (step 114). In light of the mode switching criteria provided for zone 3 in FIG. 2B, the location and mode switching information are to be updated every 15 seconds. Power measurements are not taken. As such, another Location Query is provided every 15 seconds.

At some point, the mobile terminal 12 will move from local wireless zone 3 to local wireless zone 2. When the Location Query is sent to the location information service 30 after the mobile terminal 12 has moved into local wireless zone 2 (step 116), the location information service 30 will provide the current location for the mobile terminal 12 back to the mobile terminal 12 (step 118). The current location is then sent to the mode switching information service 28 (step 120), which will use the current location to retrieve the zone (zone 2) in which the mobile terminal 12 is located (step 122), and retrieve the mode switching information based on the zone (step 124). The mode switching information is then provided to the mobile terminal 12 (step 126). Based on the mode switching information and the included switching criteria for zone 2, the mobile terminal 12 will activate the cellular mode interface to a standby mode (step 128), and initiate monitoring the local wireless and cellular power levels (step 130). The power levels are updated every two seconds and the location and mode switching information are updated every 15 seconds.

At some point, the mobile terminal 12 will move into local wireless zone 1, and a subsequent Location Query will be sent to the location information service 30 (step 132). The location information service 30 will provide the current location to the mobile terminal 12 (step 134), which will send the current location information to the mode switching information service 28 (step 136). The mode switching information service 28 will retrieve the zone in which the mobile terminal 12 is located (zone 1) from the current location information (step 138), and retrieve the mode switching information including switching criteria for zone 1 (step 140). The mode switching information is then sent to the mobile terminal 12 (step 142). At this point, the mobile terminal 12 will begin monitoring the local wireless and cellular power levels every two seconds and update the location and mode switching information every five seconds (step 144). When two consecutive power measurements are recorded where the local wireless power measurement is less than 55 dBm and the cellular power measurement is greater than 60 dBm, the need for a call handoff is detected (step 146), and the cellular interface of the mobile terminal 12 is turned on from the standby mode and a call handoff from a local wireless mode to a cellular mode is activated (step 148).

Figure 4A:
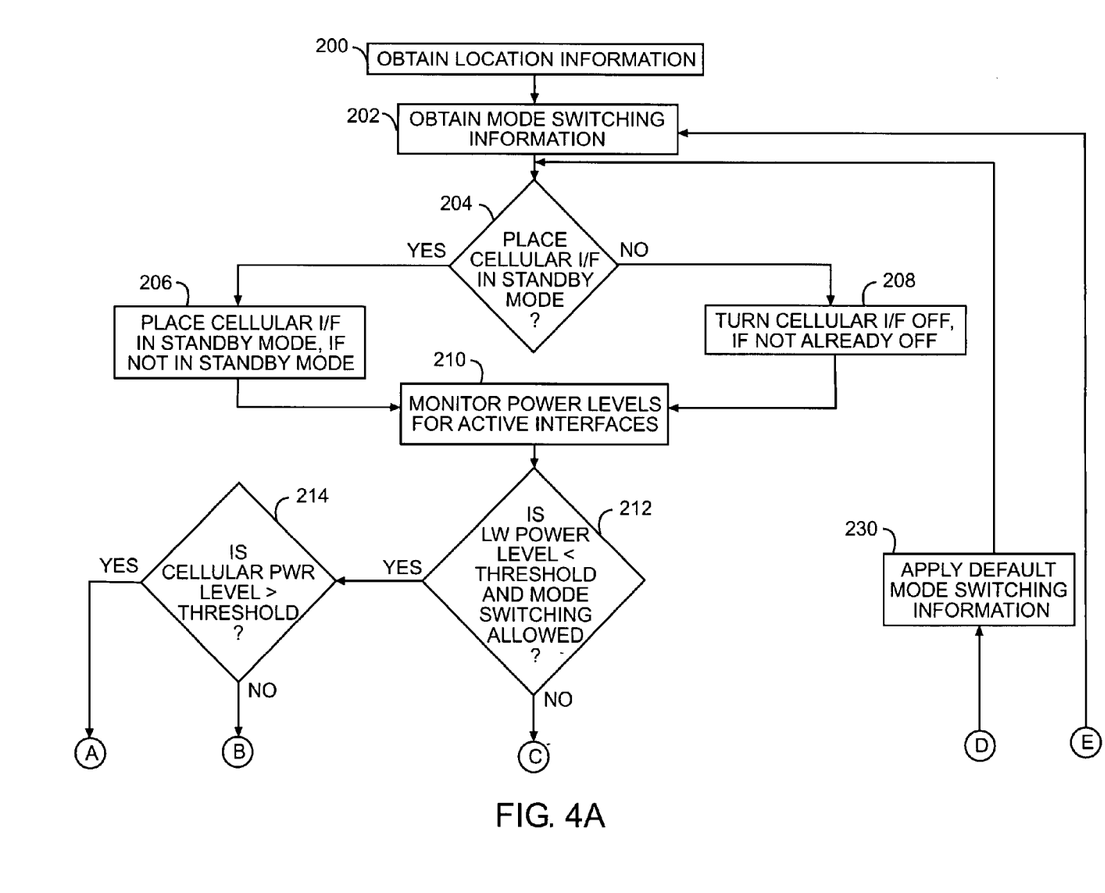
FIGS. 4A and 4B are a flow diagram illustrating the operation of a mobile terminal in a local wireless mode according to one embodiment of the present invention.
Figure 4B:
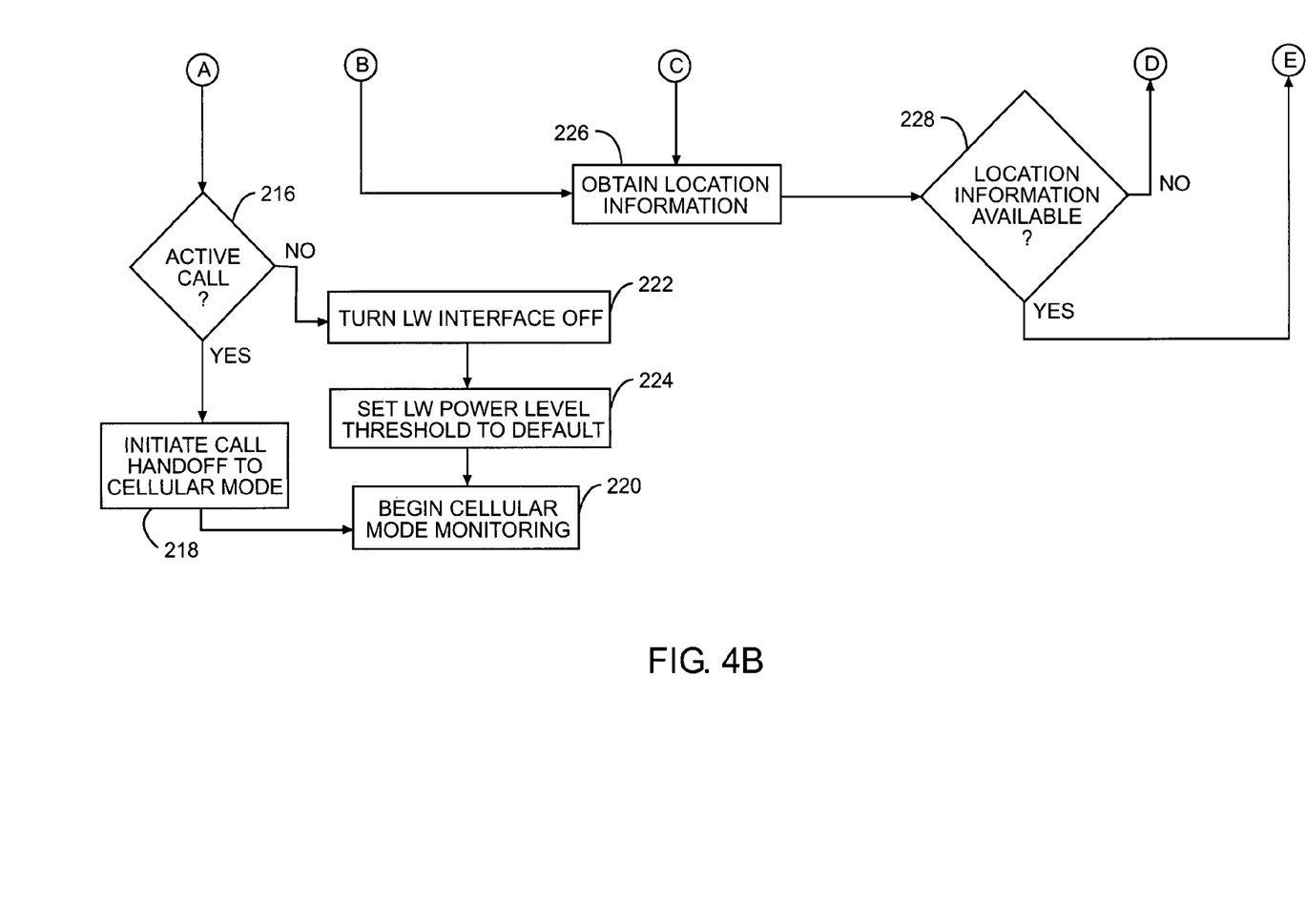

With reference to FIGS. 4A and 4B, a flow diagram is provided to illustrate operation of the mobile terminal 12 in a local wireless mode according to one embodiment of the present invention. Initially, assume the mobile terminal 12 obtains location information from the location information service 30 (step 200), and then uses the current location information to obtain the mode switching information corresponding to the current location (step 202). The mobile terminal 12 will determine whether the cellular interface should be in standby mode based on the mode switching information (step 204). If the mode switching information so indicates, the mobile terminal 12 will place the cellular interface in standby mode if the cellular interface is not already in standby mode (step 206). Alternatively, if the cellular interface should not be in standby mode according to the mode switching information, the mobile terminal 12 will turn the cellular interface off, if the cellular interface is not already off (step 208). The mobile terminal 12 will then begin to monitor the power levels for the active local wireless or cellular interfaces (step 210). If the local wireless power level is less than the threshold power level provided in the mode switching information, and mode switching to cellular mode is allowed (step 212), the mobile terminal 12 will determine if the cellular power level is less than the threshold provided in the mode switching information (step 214). If the local wireless power level is less than the local wireless threshold and the cellular power level is greater than the cellular threshold, the mobile terminal 12 will determine whether there is an active call (step 216). If there is an active call, the mobile terminal 12 will initiate a call handoff to cellular mode (step 218) and then begin cellular mode monitoring according to the mode switching information for operating in cellular mode (step 220). If there is not an active call (step 216), the mobile terminal 12 will turn the local wireless interface off (step 222), set the local wireless power level threshold to a default value (step 224), and begin the cellular mode monitoring (step 220).

If the local wireless power level is less than the threshold, mode switching to cellular mode is allowed, and the cellular power level is less than the cellular threshold (steps 212 and 214), the mobile terminal 12 will obtain current location information (step 226). Further, if either the local wireless power level is greater than the local wireless threshold, or a cellular handoff is not allowed (step 212), the mobile terminal 12 will also obtain current location information (step 226). If the current location information is not available (step 228), the mobile terminal 12 will apply default mode switching information, such as that defined in FIG. 2A for an unknown local wireless zone (step 230), and the process repeats by determining whether the cellular interface should be in standby mode for the default mode switching information (step 204). If the location information was available (step 228), the process repeats by obtaining mode switching information for the current location (step 202). This example assumes that the mobile terminal 12 has the default mode switching information locally stored. If this is not the case, the lack of location information would result in the mobile terminal 12 retrieving mode switching information from the mode switching information service 28 in the same manner as any mode switching information for a known local wireless zone would be obtained.

Figure 5:
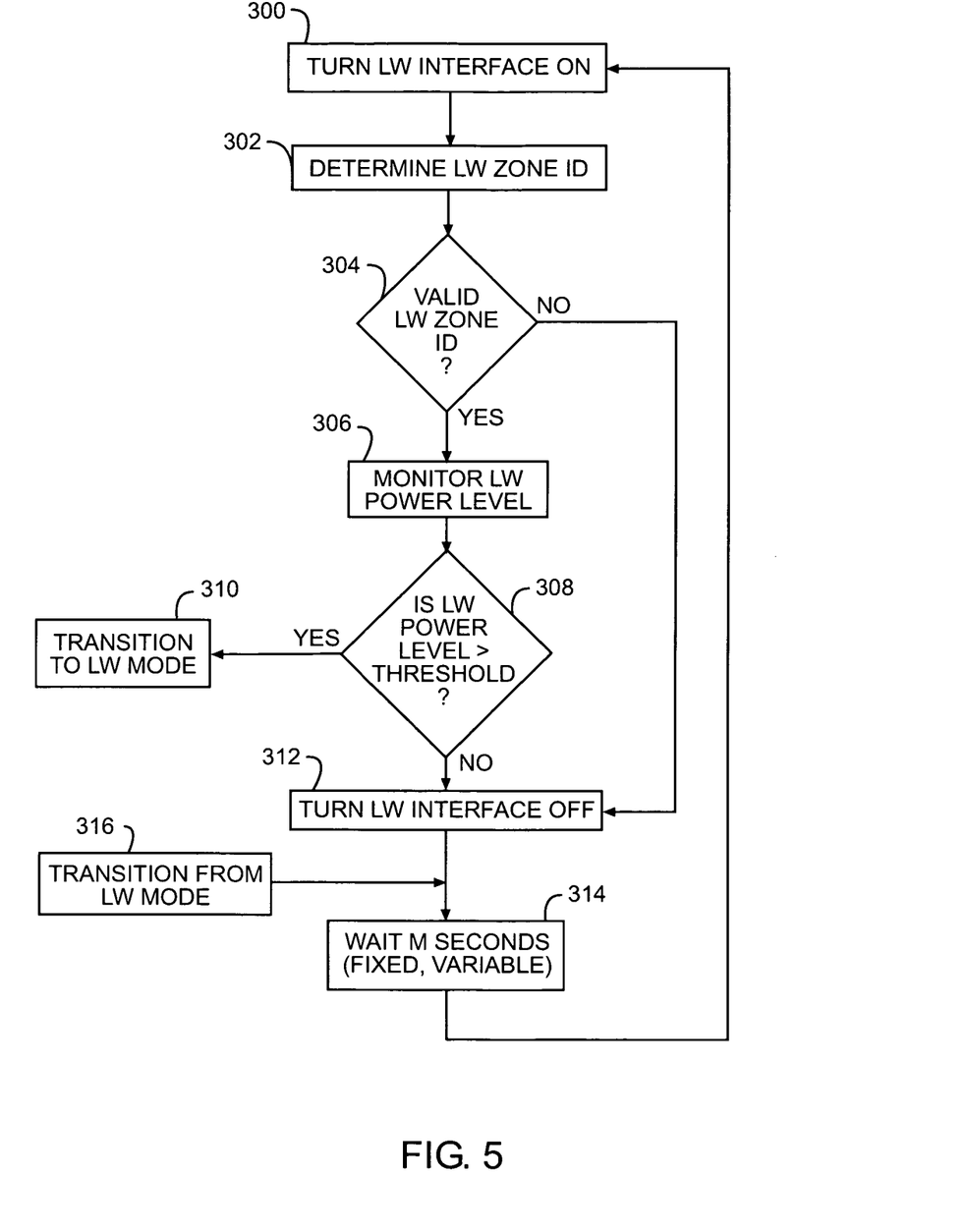
FIG. 5 is a flow diagram illustrating the operation of a mobile terminal in a cellular mode according to one embodiment of the present invention.

The cellular mode monitoring referenced in step 220 may take place according to the flow diagram of FIG. 5. In cellular mode, the mobile terminal 12 may periodically or systematically turn on the local wireless interface (step 300) and determine the local wireless zone identifiers (IDs) provided by the access points 20 from which signals can be received (step 302). The mobile terminal 12 can determine if the local wireless zone ID received form the access point(s) 20 is valid (step 304), and if it is valid, monitor the local wireless power levels associated with the local wireless zone associated with the local wireless zone ID (step 306). If the local wireless power level is greater than the local wireless threshold provided by prior mode switching information (step 308), the mobile terminal 12 will transition to local wireless mode (step 310). Accordingly, if a call is taking place, a call handoff is initiated and the cellular interface will be turned off or deactivated to a standby mode.

If the local wireless power level is less than the local wireless threshold (step 308), the mobile terminal 12 will turn the local wireless interface off (step 312) and wait for a fixed or variable period of time (M seconds) (step 134) until the process repeats. The wait period may be defined based on previously received mode switching information corresponding to the current or most recent local wireless zone in which the mobile terminal 12 is or was located. Further, a transition from a local wireless mode (step 316) may cause the mobile terminal 12 to begin cellular mode prior to waiting for the defined period of time (step 314) before activating the local wireless interface and monitoring the local wireless power levels to determine whether a transition back to local wireless mode is necessary. The parameters controlling the transition back to local wireless mode may be the mode switching information for cellular mode operation, as provided in FIG. 2B.

Figure 6:
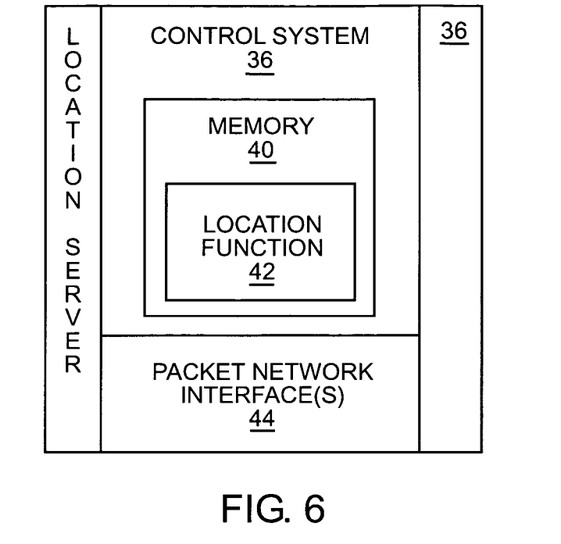
FIG. 6 is a block representation of a location server according to one embodiment of the present invention.

With reference to FIG. 6, a location server 36 supporting the location information service 30 is illustrated. The location server 36 may include a control system 38 having sufficient memory to support a location function 42. The location function 42 is capable of determining the current location of the mobile terminal 12 and providing current location information to the mobile terminal 12. The control system 38 is also associated with one or more packet network interfaces 44 to facilitate communication with various entities associated with the packet network 24. Notably, the location function 42 may be integrated into the mobile terminal 12.

Figure 7:
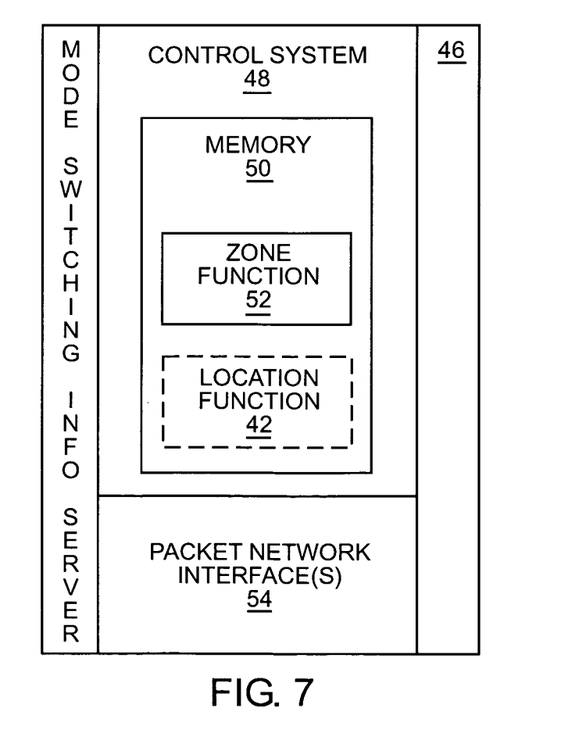
FIG. 7 is a block representation of a mode switching information server according to one embodiment of the present invention.

Turning now to FIG. 7, a mode switching information server 46 is provided to support the mode switching information service 28. The mode switching information server 46 will include a control system 48 having sufficient memory 50 to support a zone function 52, and perhaps the location function 42 in an integrated system. The zone function 52 will store mode switching information and the corresponding switching criteria for local wireless mode and cellular mode operation, and provide appropriate mode switching information to the mobile terminal 12 based on the current location of the mobile terminal 12 as described above. The control system 48 may also be associated with one or more packet network interfaces 54 to facilitate communications with various entities on the packet network 24.

Figure 8:
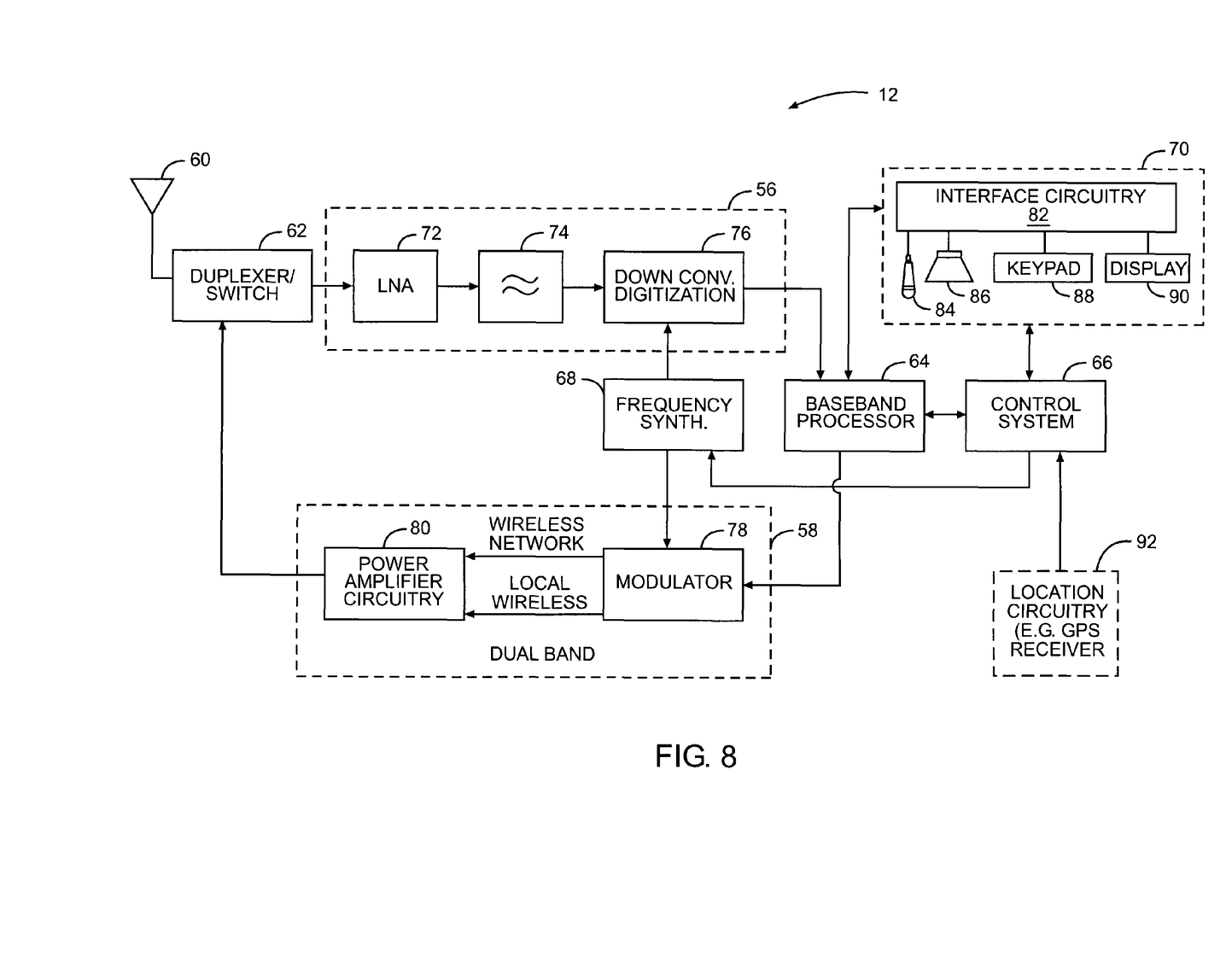
FIG. 8 is a block representation of a mobile terminal according to one embodiment of the present invention.

The basic architecture of the mobile terminal 12 is represented in FIG. 8 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

As noted above, the mobile terminal 12 must be able to communicate with the access points 20 to support local wireless communications as well as with the base stations 18 to support cellular communications. Accordingly, the receiver front end 56, baseband processor 64, and radio frequency transmitter section 58 cooperate to provide a cellular interface and a local wireless interface. These functions may be implemented using redundant circuitry, or by configuring common circuitry to operate in different modes. The configuration of the mobile terminal 12 will be dictated by economics and designer choice. The mobile terminal 12 is configured such that if the local wireless interface is not functional, communications are switched to the cellular interface. Alternatively, the mobile terminal 12 could have both the local wireless interface and the cellular interface in operation at the same time and select one of the two for communications at any given time based on signal quality or other factors, such as defined in the mode switching information.

A user may interact with the mobile terminal 12 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 24, input numbers to be dialed, address book information, or the like, as well as monitor call progress information.

Additionally, the mobile terminal 12 may include location circuitry 92, such as a Global Positioning System (GPS) receiver, which is capable of receiving GPS signals and determining the current location of the mobile terminal 12. As such, the mobile terminal 12 can use the internally determined current location to access an internal database or the mode switching service provider to retrieve the mode switching information used to control mode switching between local wireless and cellular modes.

Those skilled in the art will recognize improvements and modifications to the preferred embodiments of the present invention. All such improvements and modifications are considered within the scope of the concepts disclosed herein and the claims that follow.

What is claimed is:

1. A method for controlling mode switching between local wireless and cellular modes of a mobile terminal, the method carried out in and automatically by the mobile terminal and comprising:
    obtaining a determination of a current location of the mobile terminal;
    obtaining a determination of a current operating mode of the mobile terminal;
    obtaining at behest of the mobile terminal and from a mode switching information service that is at least partially outside the mobile terminal, mode switching information whose content is at least partly based on the determined current location and on the determined current operating mode of the mobile terminal, the obtained mode switching information comprising one or more indications of power thresholds for received signals at which handover to another operating mode is to be made allowable based on the determined current location and based on the determined current operating mode; and
    switching between a local wireless mode and a cellular mode based on the obtained mode switching information and on repeated measuring of power levels of received signals at the determined current location;
    wherein the obtained mode switching information further includes an indication of how often said obtaining of the determination of current location is to be carried out and the mobile terminal obtains the determination of the current location accordingly.

2. The method of claim 1 wherein when the mobile terminal is in the local wireless mode, the mode switching information comprises switching criteria for switching to the cellular mode.

3. The method of claim 2 further comprising using additional mode switching information, which comprises additional switching criteria for determining whether to switch over to a local wireless mode when the mobile terminal is in the cellular mode;
    wherein the used additional mode switching information includes at least one of:
        an indication of a minimum number of consecutive consistent power measurements before the switch over is allowed;
        an indication of how often power measurements are to be made;
        and
        an indication of how often updates to the mode switching information are to be made.

4. The method of claim 1 wherein the mode switching information comprises zone-specific switching criteria to use when the mobile terminal is within a given zone corresponding to the determined current location, the given zone being one of a plurality of zones respectively assigned to respective geographic areas that do not fully overlap one another.

5. The method of claim 4 wherein a plurality of areas, including that of the determined current location is associated with a respective zone having corresponding mode switching information.

6. The method of claim 5 wherein at least two different ones of the plurality of areas are associated with different mode switching information, such that the at least two different areas have different switching criteria.

7. The method of claim 4 wherein the given zone corresponds to a local wireless zone in which local wireless communications of predetermined minimum adequacy with a corresponding local wireless access point are possible, the predetermined minimum adequacy being specified by the mode switching information of the given zone.

8. The method of claim 4 wherein each area of a plurality of areas, including that of the given zone, is associated with switching criteria based on geographic characteristics of each area, the geographic characteristics including ease of having the mobile terminal physically exit the given area to an area that may not support the current operating mode.

9. The method of claim 4 wherein the switching criteria defines whether mode switching for the given zone is allowed.

10. The method of claim 4 wherein the switching criteria defines a state in which to keep activated at least one of a cellular interface and a local wireless interface of the mobile terminal for the given zone.

11. The method of claim 4 wherein the switching criteria comprises an interval at which signal levels associated with at least one of local wireless signals and cellular signals are periodically measured.

12. The method of claim 4 wherein the mode switching criteria controls how often the mode switching information for the current location is determined.

13. The method of claim 1 wherein said obtaining of the mode switching information comprises:
sending a request for the mode switching information to a mode switching information service, the request including the current location; and
receiving the mode switching information from the mode switching information service.

14. The method of claim 1 wherein said obtaining of the mode switching information comprises:
sending a request for the current location of the mobile terminal to a location information service; and
receiving current location information from the location information service.

15. The method of claim 1 further comprising:
providing local wireless communications with at least one access point associated with a packet network when the mobile terminal is in the local wireless mode; and
providing cellular communications with at least one base station associated with a cellular network when the mobile terminal is in the cellular mode.

16. A mobile terminal comprising:
at least one wireless communication interface adapted to facilitate local wireless communications in a local wireless mode of the mobile terminal and cellular communications in a cellular mode of the mobile terminal; and
a control system associated with the at least one wireless communication interface and adapted to automatically:
obtain a determination of a current location for the mobile terminal;
obtain a determination of a current operating mode for the mobile terminal;
obtain at behest of the mobile terminal and from a mode switching information service that is at least partially outside the mobile terminal, mode switching information that is a function of the obtained determination of the current location and a function of the obtained determination of the current operating mode of the mobile terminal, the mode switching information comprising one or more indications of power thresholds for received signals at which handover to another operating mode is to be made allowable; and
switch the mobile terminal between a local wireless mode thereof and a cellular mode thereof based on the obtained mode switching information and on repeated measuring of power levels of received signals at the determined current location;
wherein the obtained mode switching information further includes an indication of how often said obtaining of the determination of current location is to be carried out and the control system is configured to obtain the determination of the current location accordingly.

17. The mobile terminal of claim 16 wherein when the mobile terminal is in the local wireless mode, the mode switching information comprises switching criteria for switching to the cellular mode.

18. The mobile terminal of claim 17 wherein the control system is further adapted to obtain and use additional mode switching information, which comprises additional switching criteria for determining whether to switch over to a local wireless mode when the mobile terminal is in the cellular mode;
wherein the used additional mode switching information includes at least one of:
an indication of a minimum number of consecutive consistent power measurements before the switch over is allowed;
an indication of how often power measurements are to be made;
and
an indication of how often updates to the mode switching information are to be made.

19. The mobile terminal of claim 16 wherein the mode switching information comprises switching criteria to use when the mobile terminal is within a given area.

20. The mobile terminal of claim 19 wherein each of a plurality of areas is associated with corresponding mode switching information.

21. The mobile terminal of claim 20 wherein different ones of the plurality of areas are associated with different mode switching information, such that different areas have different switching criteria.

22. The mobile terminal of claim 19 wherein the given area corresponds to a local wireless zone in which local wireless communications are possible.

23. The mobile terminal of claim 19 wherein each area of a plurality of areas, including the given area, is associated with switching criteria based on geographic characteristics of each area, the geographic characteristics including ease of exiting the given area to an area that may not support the current operating mode.

24. A method for controlling mode switching by a wireless mobile terminal between a local wireless mode and a cellular mode of the mobile terminal, the method comprising:
automatically repeatedly obtaining a determination of a current location for the mobile terminal;
obtaining a determination of a current operating mode for the mobile terminal;
automatically repeatedly obtaining at behest of the mobile terminal and from a mode switching information service that is at least partially outside the mobile terminal, mode switching information based on the determined current location and based on the determined current operating mode of the mobile terminal, the obtained mode switching information identifying one or more power thresholds for received signals at which handover to another operating mode is to be made allowable, the obtained mode switching information further identifying a utilized update rate for at least one of said automatically repeated obtaining of the determination of the current location and said automatically repeated obtaining of the mode switching information; and
automatically switching between a local wireless mode and a cellular mode in accordance with the automatically repeatedly obtaining mode switching information.

* * * * *